US010476168B2

United States Patent
Pruett et al.

(10) Patent No.: US 10,476,168 B2
(45) Date of Patent: Nov. 12, 2019

(54) ELECTRONICALLY SCANNED ARRAY USING MANIFOLDS

(71) Applicant: Raytheon Company, Waltham, MA (US)

(72) Inventors: James A. Pruett, Allen, TX (US); Jerry M. Grimm, Plano, TX (US); Fred H. Clairmont, Plano, TX (US); Robert P. Bernard, McKinney, TX (US)

(73) Assignee: Raytheon Company, Waltham, MA (US)

( * ) Notice: Subject to any disclaimer, the term of this patent is extended or adjusted under 35 U.S.C. 154(b) by 207 days.

(21) Appl. No.: 15/613,421

(22) Filed: Jun. 5, 2017

(65) Prior Publication Data

US 2018/0351259 A1 Dec. 6, 2018

(51) Int. Cl.
*H01Q 21/00* (2006.01)
*H01Q 21/06* (2006.01)
*H01Q 3/26* (2006.01)
*H01Q 3/30* (2006.01)
*G01S 13/87* (2006.01)
*G01S 13/89* (2006.01)

(52) U.S. Cl.
CPC ....... *H01Q 21/0025* (2013.01); *G01S 13/878* (2013.01); *G01S 13/89* (2013.01); *H01Q 3/267* (2013.01); *H01Q 3/30* (2013.01); *H01Q 21/061* (2013.01)

(58) Field of Classification Search
CPC ...... H01Q 21/0025; H01Q 3/267; H01Q 3/30; H01Q 21/061
See application file for complete search history.

(56) References Cited

U.S. PATENT DOCUMENTS

| 5,854,610 A | * | 12/1998 | Wojtowicz | H01Q 3/26 342/372 |
| 6,366,259 B1 | | 4/2002 | Pruett et al. | |
| 7,538,735 B2 | * | 5/2009 | Crouch | H01Q 3/46 343/700 MS |
| 7,825,853 B2 | | 11/2010 | Bruce et al. | |
| | | (Continued) | | |

FOREIGN PATENT DOCUMENTS

GB 2508899 A 6/2014

OTHER PUBLICATIONS

U.S. Appl. No. 15/378,785, filed Dec. 14, 2016, Pruett.
(Continued)

*Primary Examiner* — Dameon E Levi
*Assistant Examiner* — Jennifer F Hu
(74) *Attorney, Agent, or Firm* — Daly, Crowley, Mofford & Durkee, LLP

(57) ABSTRACT

Methods and apparatus for an antenna assembly including one or more array blocks having one or more corporate manifolds, each having an input port, a plurality of output ports, and a plurality of phase shifters, each of the phase shifters located at a respective one of the output ports. Array blocks can further include a plurality of serial manifolds each having an input port and a plurality of output ports, the input port coupled to a respective output port of one of the corporate manifolds; and plurality of antenna elements coupled to respective output port of one of the serial manifolds.

15 Claims, 9 Drawing Sheets

(56) References Cited

U.S. PATENT DOCUMENTS

| | | | |
|---|---|---|---|
| 2006/0273972 A1* | 12/2006 | Chandler | H01Q 3/22 343/754 |
| 2007/0046547 A1* | 3/2007 | Crouch | H01Q 3/46 343/700 MS |
| 2008/0129595 A1* | 6/2008 | Choi | H01Q 3/38 342/368 |
| 2010/0026574 A1* | 2/2010 | Pozgay | H01Q 3/26 342/371 |
| 2010/0214170 A1* | 8/2010 | Quan | H01Q 21/0025 342/374 |
| 2011/0248796 A1* | 10/2011 | Pozgay | G01S 13/4463 333/137 |
| 2012/0105290 A1* | 5/2012 | Brown | H01L 23/66 343/720 |
| 2012/0319901 A1 | 12/2012 | Pruett et al. | |
| 2016/0365624 A1* | 12/2016 | Maley | H01Q 1/1228 |

OTHER PUBLICATIONS

U.S. Appl. No. 15/378,797, filed Dec. 14, 2016, Pruett.
PCT International Search Report and Written Opinion dated Aug. 13, 2018 for International Application No. PCT/US2018/034993; 17 Pages.

* cited by examiner

ELECTRONICALLY SCANNED ARRAY USING MANIFOLDS

BACKGROUND

As is known in the art, an electronically scanned array (ESA) is a type of phased array antenna for use in radar systems wherein transmit and receive beams can be electronically formed and directed (or "pointed" or "steered" or "scanned") by appropriate phasing of antenna elements. A passive electronically scanned array (PESA), also known as passive phased array, is a type of ESA in which the antenna elements are connected to a single transmitter and/or receiver. PESA radar systems may include a single RF signal generating source accompanied with a radiating aperture consisting of an array of elements that phase shift the RF signal to form beam shapes and steer the beams.

Existing ESAs are more expensive than a mechanically scanned antenna of comparable size and power. In addition, existing ESAs may have relatively large fixed-shaped apertures that cannot be easily collapsed for compact transportation and/or storage.

SUMMARY

Described herein are concepts, structures, and techniques to provide a low-cost, portable electronically scanned array (ESA) for use within a radar system.

In one aspect, an antenna assembly comprises: one or more array blocks, at least one of the array blocks including: one or more corporate manifolds, each of the corporate manifolds having an input port, a plurality of output ports, and a plurality of phase shifters, each of the phase shifters located at a respective one of the output ports; a plurality of serial manifolds each having an input port and a plurality of output ports, the input port coupled to a respective output port of one of the corporate manifolds; and a plurality of antenna elements coupled to respective output port of one of the serial manifolds.

An antenna assembly can further include one or more of the following features: the serial manifolds are passive electronic elements, each of the serial manifolds are configured to generate a phase shift across the antenna elements that is a function of a frequency of an RF signal applied at the serial manifold input port, in response to an RF signal applied to an input port of one of the corporate manifolds, the corporate manifold phase shifts the RF signal in azimuth and the serial manifolds coupled to the output ports of the corporate manifold phase shift the RF signal in elevation, the one or more array blocks includes at least two array blocks mechanically connected together, the at least two array blocks are connected by hinged connectors, one or more support structures, wherein each of the serial manifolds is coupled to one of the support structures, the support structures comprise a rigid foam material, at least two serial manifolds are coupled to each of the support structures, the support structures are arranged in a stack, the serial manifolds are positioned on the respective support structures that all the antenna elements coupled thereto are adjacent to a first side of the stack, the corporate manifolds are coupled to a second side of the stack opposite of the first side, and/or the one or more support structures includes at least six support structures each having at least two serial manifolds coupled thereto.

In another aspect, an electronically scanned array (ESA) radar system comprises: a transmitter; a receiver; and an antenna assembly comprising: one or more array blocks, at least one of the array blocks including: one or more corporate manifolds, each of the corporate manifolds having an input port, a plurality of output ports, and a plurality of phase shifters, each of the phase shifters located at a respective one of the output ports; a plurality of serial manifolds each having an input port and a plurality of output ports, the input port coupled to a respective output port of one of the corporate manifolds; and a plurality of antenna elements coupled to respective output port of one of the serial manifolds.

An electronically scanned array (ESA) radar system can further include one or more of the following features: the serial manifolds are passive electronic elements, each of the serial manifolds are configured to generate a phase shift across the antenna elements that is a function of a frequency of an RF signal applied at the serial manifold input port, in response to an RF signal applied to an input port of one of the corporate manifolds, the corporate manifold phase shifts the RF signal in azimuth and the serial manifolds coupled to the output ports of the corporate manifold phase shift the RF signal in elevation, the one or more array blocks includes at least two array blocks mechanically connected together, the at least two array blocks are connected by hinged connectors, one or more support structures, wherein each of the serial manifolds is coupled to one of the support structures, the support structures comprise a rigid foam material, at least two serial manifolds are coupled to each of the support structures, the support structures are arranged in a stack, the serial manifolds are positioned on the respective support structures that all the antenna elements coupled thereto are adjacent to a first side of the stack, the corporate manifolds are coupled to a second side of the stack opposite of the first side, and/or the one or more support structures includes at least six support structures each having at least two serial manifolds coupled thereto.

In a further aspect, a method for providing an antenna assembly comprises: providing one or more array blocks, at least one of the array blocks including: providing one or more corporate manifolds, each of the corporate manifolds having an input port, a plurality of output ports, and a plurality of phase shifters, each of the phase shifters located at a respective one of the output ports; providing a plurality of serial manifolds each having an input port and a plurality of output ports, the input port coupled to a respective output port of one of the corporate manifolds; and providing a plurality of antenna elements coupled to respective output port of one of the serial manifolds.

A method can further include one or more of the following features: the serial manifolds are passive electronic elements, each of the serial manifolds are configured to generate a phase shift across the antenna elements that is a function of a frequency of an RF signal applied at the serial manifold input port, in response to an RF signal applied to an input port of one of the corporate manifolds, the corporate manifold phase shifts the RF signal in azimuth and the serial manifolds coupled to the output ports of the corporate manifold phase shift the RF signal in elevation, the one or more array blocks includes at least two array blocks mechanically connected together, the at least two array blocks are connected by hinged connectors, one or more support structures, wherein each of the serial manifolds is coupled to one of the support structures, the support structures comprise a rigid foam material, at least two serial manifolds are coupled to each of the support structures, the support structures are arranged in a stack, the serial manifolds are positioned on the respective support structures that all the antenna elements coupled thereto are adjacent to a first side of the stack, the corporate manifolds are coupled to a second side of the stack opposite of the first side, and/or the one or more support structures includes at least six support structures each having at least two serial manifolds coupled thereto.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

As used herein, the term "direction" refers to a transmit/receive beam's azimuth and elevation, taken together, whereas the term "direction component" refers to either a beam's azimuth or its elevation (i.e., a beam's direction comprises two direction components).

Figure 1:
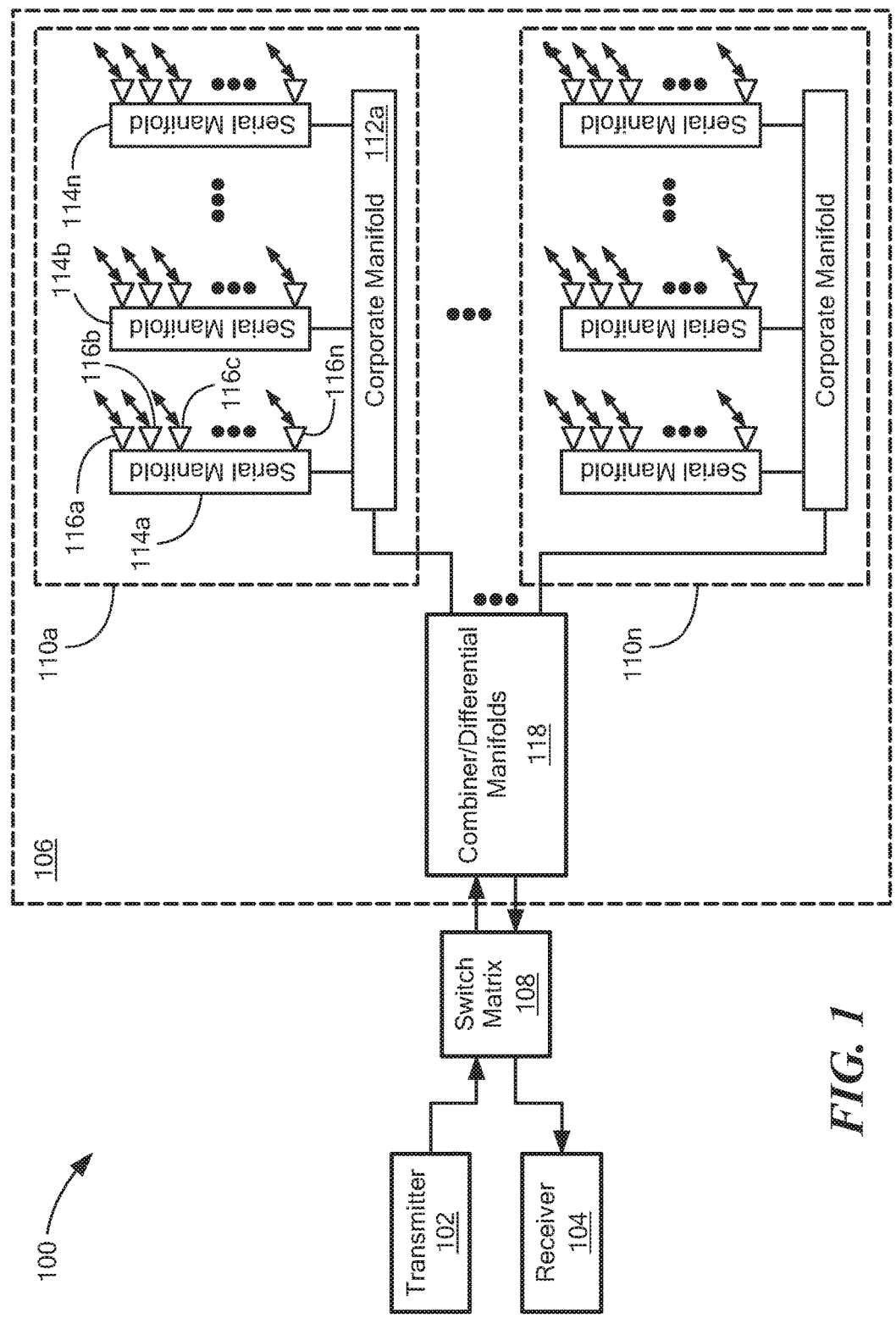
FIG. 1 is a block diagram of an electronically scanned array (ESA) radar system, in accordance with an embodiment.

Referring to FIG. 1, a radar system 100 includes a transmitter 102 and a receiver 104 each coupled to an electronically scanned array (ESA) 106 via one or more signal paths, as shown. The ESA 106 (or "antenna assembly" or "array") includes a plurality of array blocks 110a ... 110n (generally denoted 110) coupled to the transmitter 102 and receiver 104 via combiner/differential manifolds 118. In certain embodiments, the transmitter 102 and receiver 104 may be coupled to the ESA 106 via one or more RF cables, such as flexible coaxial cables. An example of a combiner/differential manifold is the manifold shown in FIG. 2. It is understood that combiner/differential manifold 118 can comprise a rat-race coupler or other suitable configuration to provide sum and difference ports. The manifold 118 can receive signals from one or more array blocks 110.

A first array block 110a, which may be representative of other array blocks 110, includes a corporate manifold 112a having an input port (or "feed port") coupled to the combiner/differential manifolds 118 and a plurality of output ports each coupled an input port (or "feed port") of a respective one of a plurality of serial manifolds 114a ... 114n (114 generally). It should be understood that the terms "input port" and "output port" are used herein for convenience and that any of the manifold ports may be used in a bi-directional manner (i.e., to both transmit and receive RF signals). A first serial manifold 114a, which may be representative of other serial manifolds 114, includes a plurality of antenna elements (or more simply "elements") 116a-116n (generally denoted 116) each coupled to a respective output port of the serial manifold 114a. Collectively, the array elements 116 collectively form a radiating aperture via which the radar system 100 can transmit and receive beams.

Transmitter 102 may be provided as any type of transmitter capable of providing signals to the array 106 at desired transmit frequencies of the radar system. In various embodiments, array 106 is provided as a passive electronically scanned array (PESA) and transmitter 102 includes an RF signal generating source to provide RF signals to each of the array blocks 110. The RF signal generating source may be provided as a magnetron, a klystron, a TWT (Traveling Wave Tube), a SST (Solid State Transmitter), or other suitable type of RF signal generator. In addition, the transmitter 102 provides control signals to each array block 110 that determine the phase shift in azimuth and elevation produced by the array block. In many embodiments, the transmitter 102 provides the same RF signal, but separate control signals, to each block 110a. An array block 110 phase shifts the RF signal to radiate beams into free space having desired beam shapes, and desired directions in azimuth and elevation. In particular embodiments, some array blocks 110 may transmit/receive concurrently, whereas other array blocks may not (i.e., array blocks may be selectively enabled/disabled). As described below in more detail, selectively enabling/disabling array blocks 110 may be done to switch between a wide transmit/receive beam and a narrow transmit/receive beam.

Receiver 104 may be provided as any type of receiver capable of receiving signals at desired frequencies of the radar system. Receiver 104 may include analog and/or digital components including but not limited to a processor, a volatile memory and a non-volatile memory (e.g., hard disk). The non-volatile memory can store computer instructions, an operating system and data. In one embodiment, the data may include data collected corresponding to signals transmitted from and/or received at one or more array elements 116. The data may include complex I/Q data representing the signal. For example, in some embodiments, the data may include complex voltage signals representative of angle, amplitude, phase, and/or a polarization of the signal. The data may include an angle measurement of the signal relative to the phase center of the respective array element that received the signal.

In the embodiment of FIG. 1, a switch matrix 108 may be disposed in a signal path between the transmitter 102 and the array 106, and between the receiver 104 and the array 106. The switch matrix 108 may be used to switch between transmit and receive modes of the radar system 100. In certain embodiments, switch matrix 108 may be eliminated. For example, transmitter 102 and receiver 104 may be directly coupled to the array 106. As another example, transmitter 102 and receiver 104 may be provided as a combined transmit-receive module.

As discussed above, the array elements 116 collectively form a radiating aperture via which the radar system 100 can transmit and receive beams. The serial 114 and corporate manifolds 112 are operable to phase shift an RF signal generated by the transmitter 102 to radiate a beam having a desired shape and direction. In particular, the corporate manifolds 112 phase shift the RF signal to steer the beam in first direction component, whereas the serial manifolds 114 phase shift the RF signal to steer the beam in a second direction component. In various embodiments, the corporate manifolds 112 steer the beam in azimuth, and the serial manifolds 114 steer the beam in elevation. In other embodiments, the corporate manifolds 112 steer the beam in elevation and the serial manifolds 114 steer the beam in azimuth. In either arrangement, the combination of corporate and serial manifolds provide beam steering in azimuth and elevation. In some embodiments, antenna elements 116 may be provided as flared notch radiators.

In various embodiments, a given corporate manifold (e.g., corporate manifold 112a) includes a plurality of phase shifters, one located at each of its output ports. Thus, the feed to each serial manifold 114 is phase shifted to steer the transmit/receive beam in the first direction component (e.g., azimuth). The corporate manifold feed cable may provide power and control for the phase shifters, in addition to the RF signal. In some embodiments, a corporate manifold 112 may be the same as or similar to corporate manifold 200 shown in FIG. 2 and described below in conjunction therewith.

In many embodiments, a given serial manifold (e.g., serial manifold 114a) may be provided as a passive circuit, meaning that it does not include phase shifters or other active components. Instead, the phase shift across the serial manifold output ports is a function of the transmit signal frequency (i.e., the frequency of an RF signal generated by the transmitter 102). Thus, the transmitter 102 can modulate the frequency of the RF signal to steer the beam in the second direction component (e.g., elevation). In such embodiments, the array 106 may be referred to as a "frequency scanning array." In some embodiments, a serial manifold 114 may be the same as or similar to serial manifold 300 shown in FIG. 3 and described below in conjunction therewith.

As described below in conjunction with FIG. 5, an array block 100 may include two or more corporate manifolds each coupled to a respective plurality of serial manifolds.

Thus, for example, the portions of FIG. 1 labeled 110a and 110n may, collectively, form a single "array block" according to some embodiments. In general, the term "array block" herein refers to a portion of an ESA that can provide beam steering in azimuth and elevation.

In certain embodiments, two or more array blocks 110 may be mechanically connected to form the array 106. In certain embodiments, array blocks may be connected using hinges to allow the ESA 106 to be folded for storage or transportation, and unfolded for deployment.

It is appreciated that the array architecture described herein may include a large number of antenna elements with relatively few phase shifters compared to existing arrays. For example, in one embodiment, the array 106 may include 10,000 array elements 106 and only 100 phase shifters.

Figure 2:
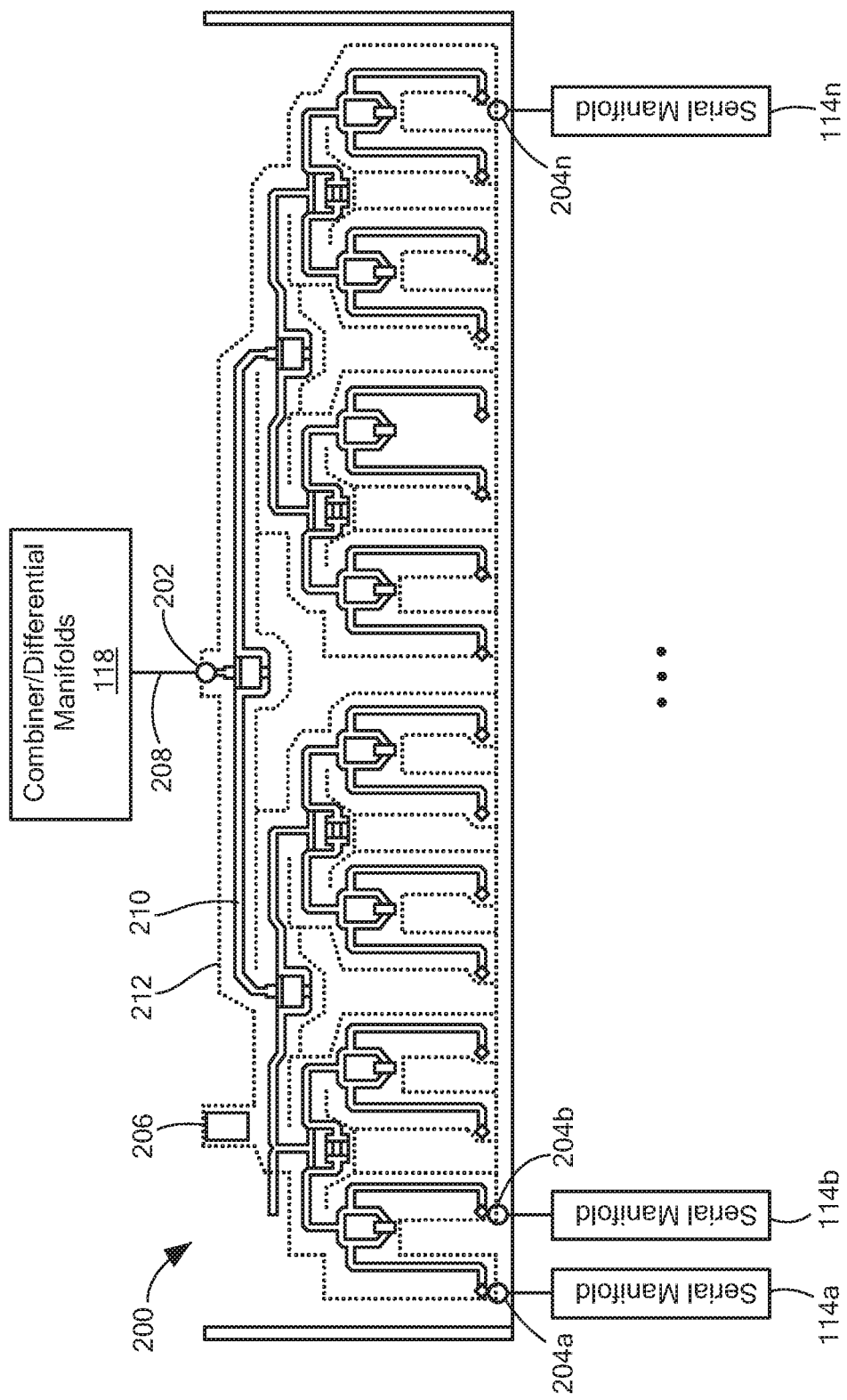
FIG. 2 is a diagram of a corporate manifold for use in an ESA radar system, in accordance with an embodiment.

Referring to FIG. 2, in which like elements of FIG. 1 are shown using like reference designators, a corporate manifold 200 may be provided as a N:1 divider/combiner circuit, according to some embodiments. The illustrative corporate manifold 200 includes an input port 202 a plurality (N) of phase shifters 204a, 204b, . . . , 204n (204 generally). It is understood that combiners/dividers do not have to be 1:1, they can be 5:4 or 3:2 for instance.

The input port 202 is coupled to each of the phase shifters 204 via circuit 210. The layout of circuit 210 may be selected such that an RF signal applied to the input port 202 will result in the same RF signal (i.e., in terms of frequency and phase) being produced at each of the phase shifters 204. The corporate manifold 200 may also include a fence 212 located around the circuit 210, as shown, to provide electrical isolation. In particular embodiments, the corporate manifold 200 may be provided as a circuit board having conductive structures formed through a screen printing, etch, or write process.

The input port 202 may be coupled to combiner/different manifolds 118 via an RF signal path 208, and each of the output ports 204 may be coupled to a feed port of a respective serial manifold 114a, 114b, . . . , 114n. In some embodiments, signal path 208 (or "feed cable") may be provided as a flexible coaxial cable. In many embodiments, feed cable 208 may also provide power and control signals to the phase shifters 204.

In the embodiment of FIG. 2, the corporate manifold 200 includes sixteen (16) output ports and corresponding phase shifters 204 and, thus, can feed sixteen (16) serial manifolds 114. For clarity, only three of phase shifters 204 are labeled in FIG. 2, and only three serial manifolds 114 are shown.

Figure 3:
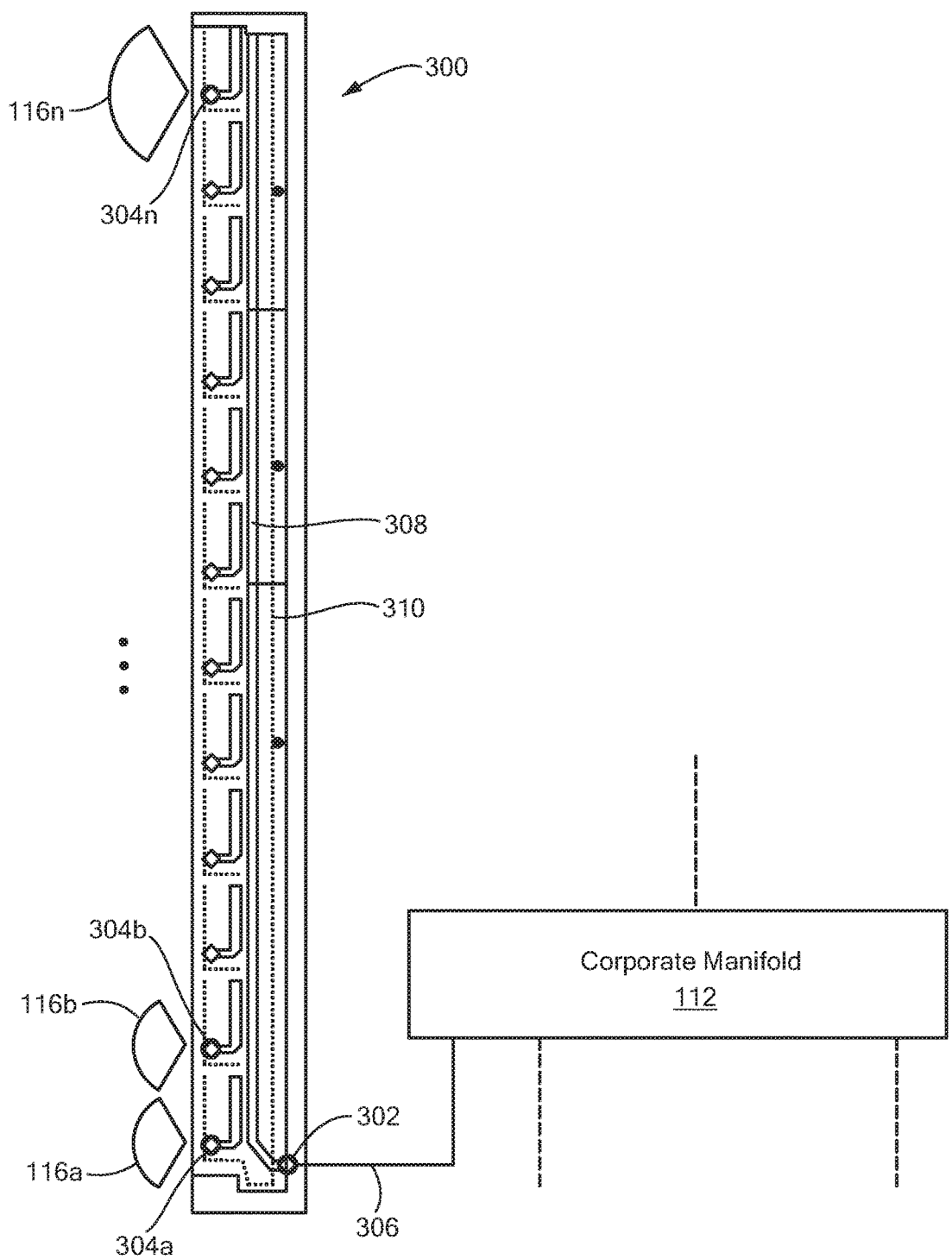
FIG. 3 is a diagram of a serial manifold for use in an ESA radar system, in accordance with an embodiment.

Referring to FIG. 3, in which like elements of FIG. 1 are shown using like reference designators, a serial manifold 300 includes an input port 302 and a plurality (N) of output ports 304a, 304b, . . . , 304n (304 generally) coupled via circuit 308. The illustrative serial manifold 300 also includes a fence 310 located around the circuit 308, as shown, to provide electrically isolation. As shown, the input port 302 may be coupled to an output port of corporate manifold 112 via an RF signal path 306 and each output port 304 may be coupled a respective antenna element 116a, 116b, . . . , 116n (116 generally).

In the embodiment of FIG. 3, the serial manifold 300 includes twelve (12) output ports 304 to which twelve (12) antenna elements 116 may be coupled. For clarity, only three of the output ports 304 are labeled in FIG. 3, and only three antenna elements 116 are shown.

In various embodiments, the phase shift across the output ports 304a-304n is a function of the frequency of the RF signal applied at the input port 302. In certain embodiments, the spacing between the output ports 304 may be selected to produce a desired amount of relative phase shift across the output ports at a given "center" operating frequency (e.g., the center operating frequency used by radar system 100). Because the phase shift across the output ports depends on the RF signal wavelength, varying the signal frequency has the effect of varying the phase shift. In some embodiments, the phase shift across the manifold output ports 304 is directly proportional to the ratio of the frequency change. For example, a 10% change in signal frequency may result in a 10%×360°=36° change in phase for that element.

In particular embodiments, the serial manifold 300 may be provided as a circuit board having conductive structures formed through a screen printing, etch, or write process.

In various embodiments, the serial manifold 300 may be constructed of materials that can be readily bonded to a support structure. In certain embodiments, serial manifold 300 may be provided as a flex circuit (e.g., a Kapton flex circuit). In other embodiments, serial manifold 300 may be provided as a conventional Printed Wiring Board (PWB). In particular embodiments, serial manifold 300 has a longest edge that is 18 to 24 inches in length.

Figure 4:
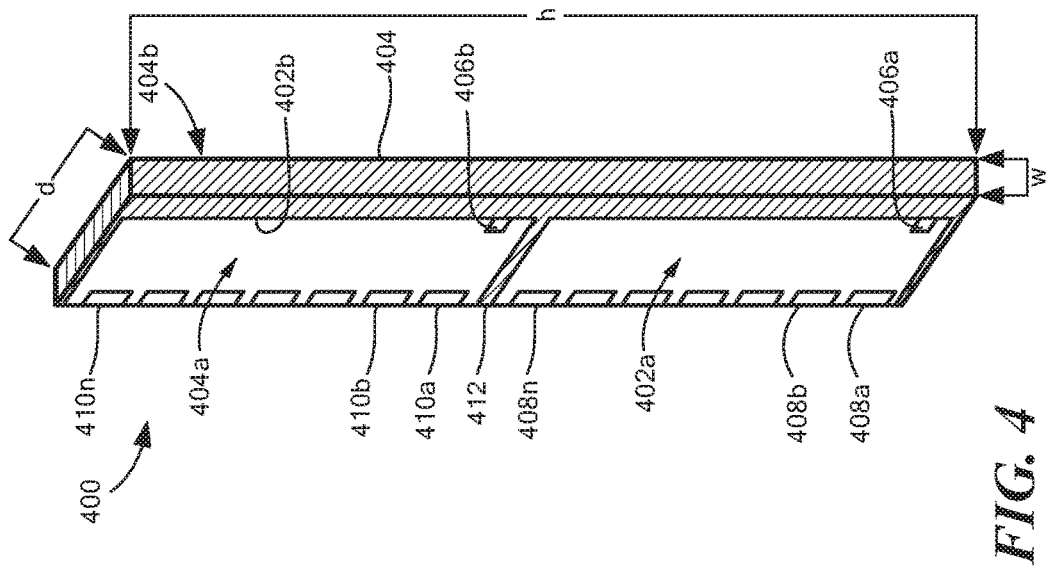
FIG. 4 is a perspective view of a subarray for use in an ESA radar system, according to some embodiments.

Referring to FIG. 4, according to some embodiments, a subarray 400 that may form a portion of an ESA includes a support structure 404 and a pair of serial manifolds 402a, 402b coupled thereto. The support structure 402 may be provided as any material (or combination of materials) onto which the serial manifolds 402 may be supported. In various embodiments, the support structure 402 may be provided as a material that is both strong and lightweight, such as a rigid foam material. In many embodiments, the support structure 402 has a dielectric constant similar to air.

The support structure 404 may have any shape and size suitable for supporting the serial manifolds 402. In the embodiment of FIG. 4, support structure 404 has a box-like shape with opposing sides 404a and 404b. In certain embodiments, support structure 404 has a width (w) in the range 0.1 to 1 inch, a depth (d) in the range 1.0-4.0 inches and/or a height (h) in the range 12 to 48 inches.

A first serial manifold 402a includes input port 406a and a plurality of antenna elements 408a, 408b, . . . , 408n (408 generally) coupled by a circuit (not shown). A second serial manifold 402b includes input port 406b and a plurality of antenna elements 410a, 410b, . . . , 410n (410 generally) coupled by a circuit (not shown). In some embodiments, the serial manifolds 402a, 402b (402 generally) each have the same number of antenna elements. The serial manifold input ports 406a, 406b may each be coupled to an output port of a corporate manifold (e.g., a corporate manifold 112 in FIG. 1). In certain embodiments, a serial manifold 402 may be the same as or similar to serial manifold 300 shown in FIG. 3.

The serial manifolds 402a, 402b may be coupled to the support structure 404 using any suitable process. "Coupled" is defined herein as including any method and/or materials suitable for directly or indirectly joining two or more materials, such as by using adhesives, fasteners, welding, hot bonding, pressure bonding, riveting, screwing, etc.

In one embodiment, serial manifolds 402 may be coupled directly to the support structure using an adhesive, such as a high strength epoxy, etc. One specific example of such an adhesive is BF548 epoxy film available from Bryte Technologies, Inc. In particular embodiments, the serial manifolds 402 may be laminated to the support structure 404. In particular embodiments, the serial manifolds 402 may be coupled to the same side of the support structure 404 (e.g., side 404a as shown in FIG. 4).

The serial manifolds 402 are positioned on the support structure 404 such that the antenna elements 408, 410 can effectively transmit and receive beams into free space when multiple support structures 404 are stacked together (as discussed below in conjunction with FIG. 5). In the embodiment shown, the serial manifolds 402 may be positioned such that the array elements 408, 410 are adjacent to an edge of the support structure. In other embodiments, the array elements may extend beyond the edge of the support structure.

In many embodiments, the subarray 400 includes no active components. It is appreciated that this may eliminate the need for active cooling techniques, reducing costs and monolithic array structures to be constructed from many subarrays 400.

Figure 5:
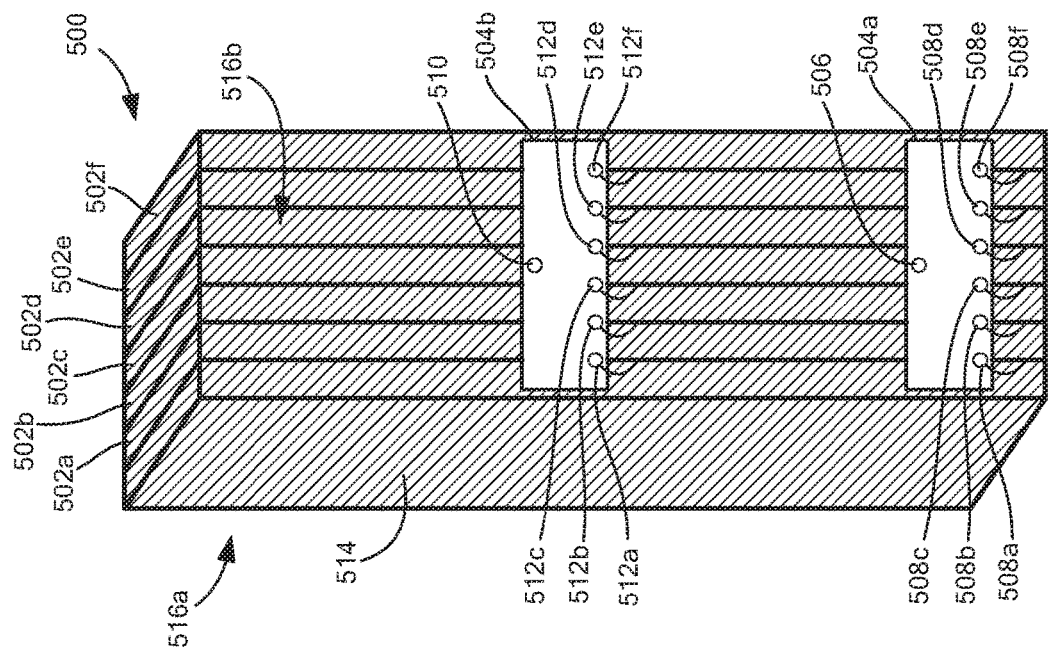
FIG. 5 is a perspective view of an array block for use in an ESA radar system, according to some embodiments.
Figure 5A:
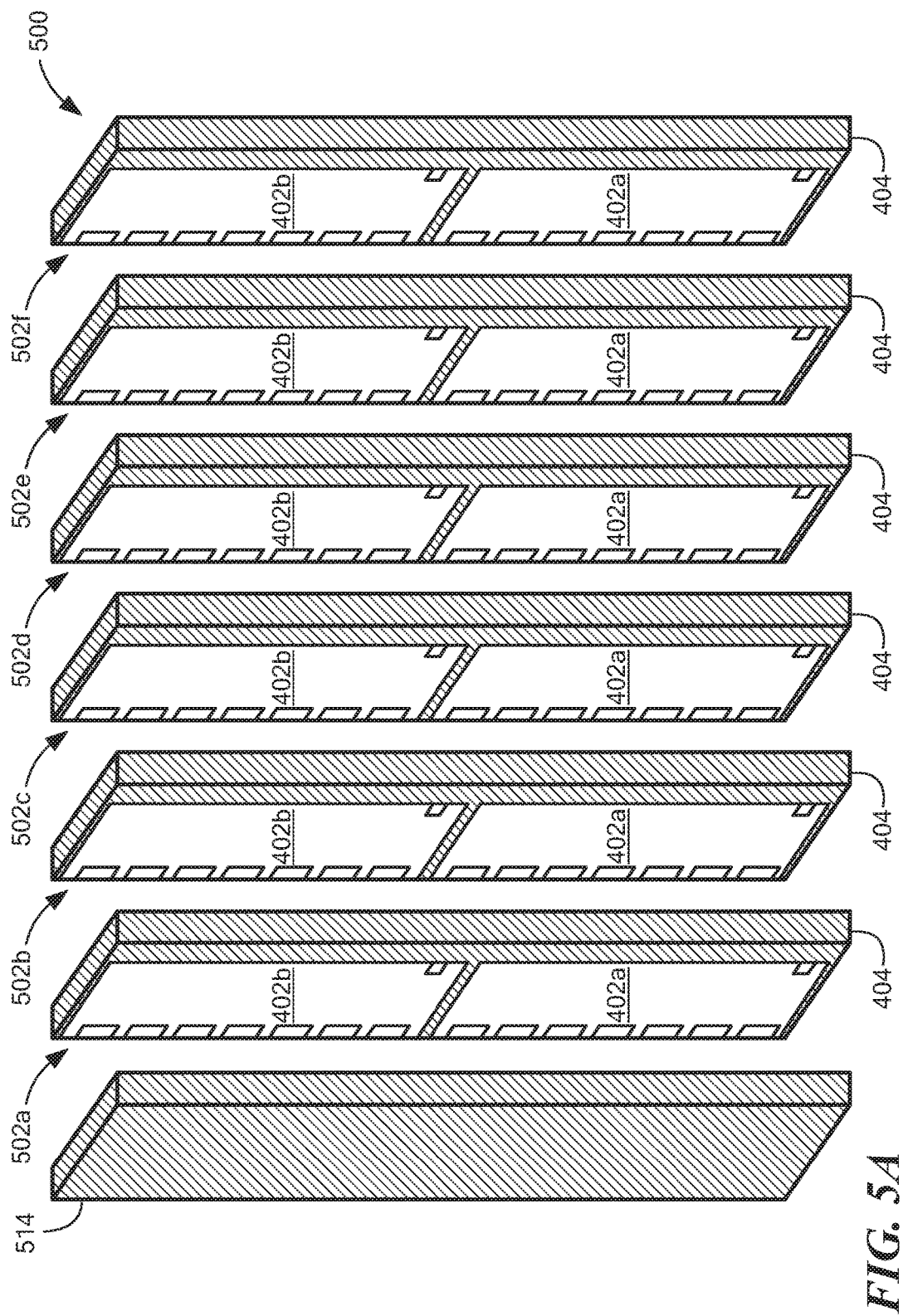
FIG. 5A is an exploded view of the array block shown in FIG. 5.

Referring now to FIGS. 5 and 5A, in which like elements of FIG. 4 are shown using like reference designators, an array block 500 may be formed by coupling together a plurality of subarrays in a stacked arrangement. In the embodiment shown, six subarrays 502a-502f (502 generally) are stacked together. Each of the subarrays 502 includes a pair of serial manifolds 402a, 402b coupled to a respective support structure 404. In addition to the subarrays 502, the array block 500 includes an additional support structure 514 coupled to a first one of the subarrays 502a, also in a stacked arrangement. The additional support structure 514 is referred to herein as a "blank" support structure. The stacked arrangement of subarrays 502 and blank support structure 514 is referred to herein as "the stack." As shown in FIG. 5, the stack has a front side 516a and a back side 516b, with only the back side 516b visible in the drawings. The serial manifolds 402 may be positioned on the respective support structures 404 such that all the antenna elements may effectively transmit and receive beams from the front side (or "radiating side") 516a of the stack.

As can be seen in FIG. 5A, subarrays 502 and blank support structure 514 may be arranged such that each serial manifold 402a, 402b is coupled (or "sandwiched") between two support structures 404. In this arrangement, the support structures 404, 514 may provide electrical isolation between the serial manifolds 402. Other factors that may determine the degree of electrical isolation between the serial manifolds 402 include the dimensions of the support structures 404, the size and position of the serial manifolds 402 on each support structure 404, and the materials selected for the support structures.

Figure 5B:
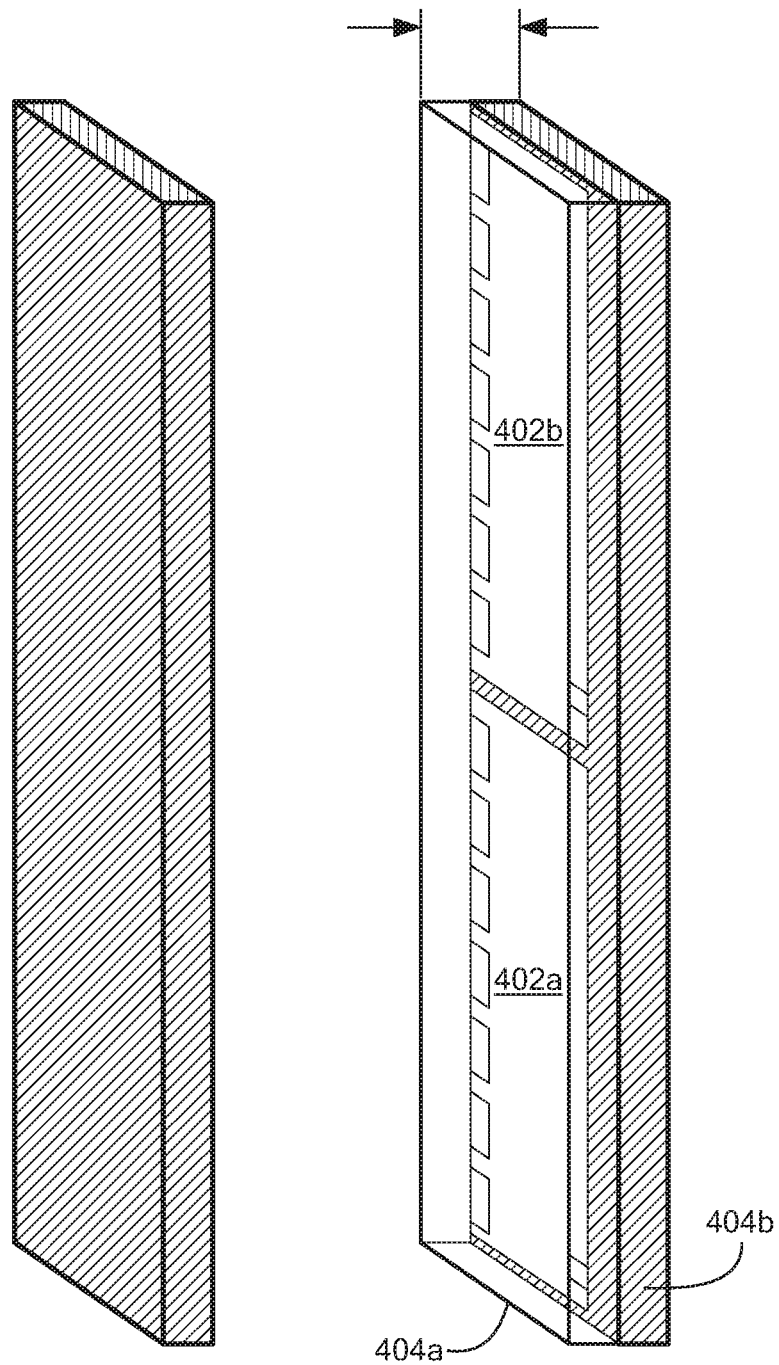
FIG. 5B is an exploded view of a portion of an array block.

In another configuration shown in FIG. 5B, for example, there is a half-thickness support structure 404a,b on both sides of the serial manifolds 402a and 402b. Since each support structure 404a,b provides half the thickness on each side of the manifolds 402, the arrays can be stacked side-by-side without 'blind spots' in the overall array.

Referring again to FIG. 5, the array block 500 further includes first and second corporate manifolds 504a, 504b (504 generally). To promote clarity in the drawings, the corporate manifolds 504 are omitted from FIG. 5A. In some embodiments, the corporate manifolds 504 may be coupled directly to the stack, e.g., to the back side 516b of the stack as shown in FIG. 5. In other embodiments, a corporate manifold 504 may be coupled to a separate support structure, which in turn may be coupled to the stack. A corporate manifold 504 may be the same as or similar to corporate manifold 200 shown in FIG. 2.

A first corporate manifold 504a has an input port 506 and a plurality of output ports, with six (6) output ports 508a-508f shown in the example of FIG. 5. A second corporate manifold 504b has an input port 510 and a plurality of output ports, with six (6) output ports 512a-512f shown in the example of FIG. 5. The six (6) output ports 508a-508f of first corporate manifold 504a may be coupled to respective input ports of the six (6) serial manifolds 402a shown in FIG. 5A, and the six (6) output ports 512a-512f of the second corporate manifold 504b may be coupled to respective input ports of the six (6) serial manifolds 402b shown in FIG. 5A. It should be understood that the number of corporate manifold output ports 508, 512 may vary based on the number of subarrays 502 within the array block. In some embodiments, the corporate manifolds 504 provide azimuth phase shifting, and the serial manifolds 502 provide elevation phase shifting.

In certain embodiments, an array block 500 may be covered by a radome. In some embodiments, the radome may be provided as a polyethylene sheet (e.g., 0.030 inch thick polyethylene) bonded to the radiating side 516a of the stack. It is appreciated that such a radome may provide a rugged covering to protect the array block 500 from ice accumulation and other environmental conditions.

Figure 6:
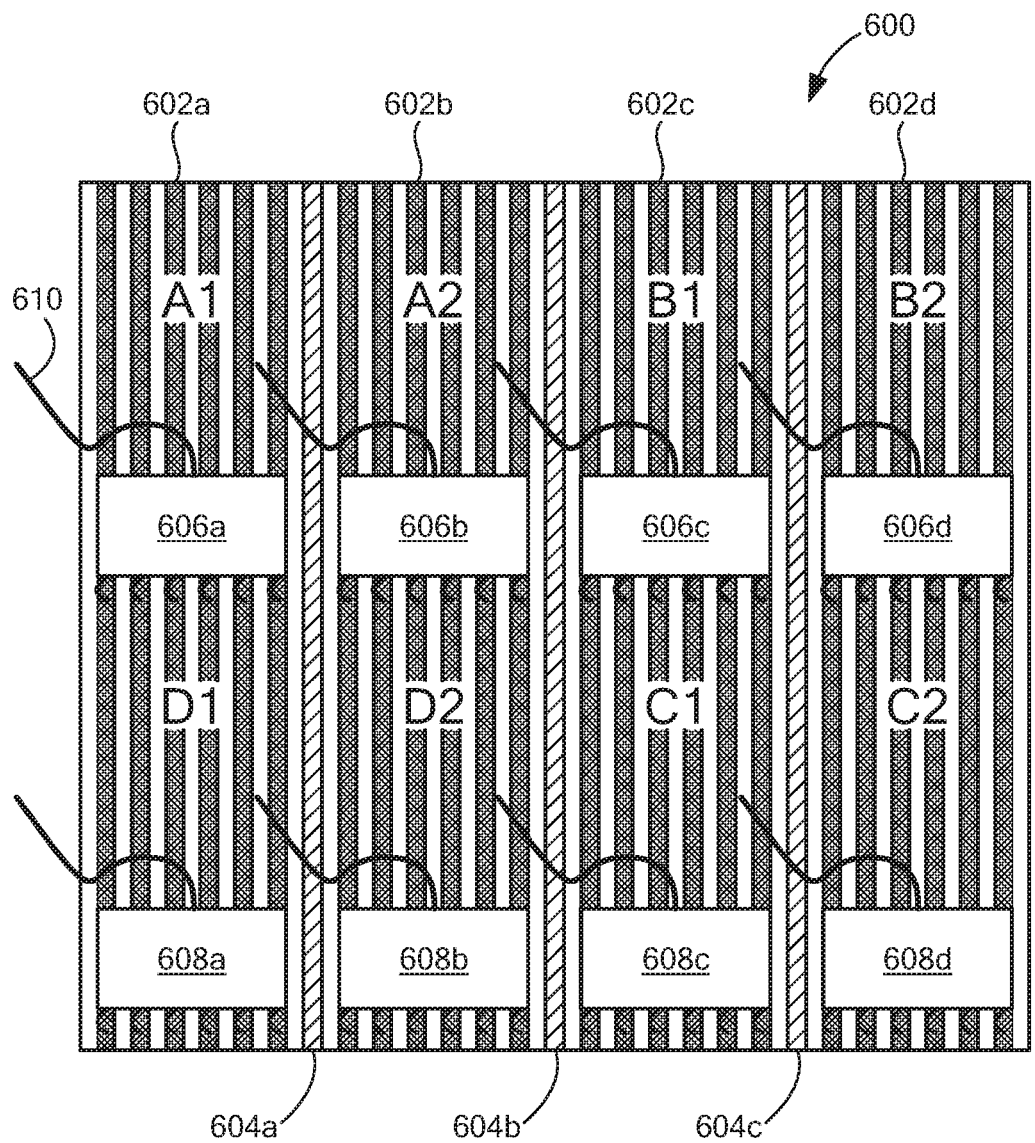
FIG. 6 is a rear view of an array for use in an ESA radar system, according to some embodiments.

Referring to FIG. 6, a plurality of array blocks may be mechanically connected together to form an array 600 for use within a radar system (e.g., radar system 100 of FIG. 1). In the embodiment shown, four array blocks 602a-602d (602 generally) are connected, with a first array block 602a connected to a second array block 602b by a first connector 604a, the second array block 602b connected to a third array block 602c by a second connector 604b, and the third array block 602c connected to a fourth array block 602d by a third connector 604c. A given array block 602 may be the same as or similar to array block 500 shown in FIGS. 5 and 5A and described above in conjunction therewith.

The connectors 604a-604c (604 generally) may be any type of connector suitable for connecting two array blocks 602 together and maintaining a desired spacing between the subarrays thereof. In many embodiments, the connectors 604 are provided as hinged connectors (e.g., piano hinges) to allow the array 600 to be rearranged into different configurations, such as those shown in FIGS. 6A-6D. In some embodiments, the connectors 604 are selected to allow the array 600 to be unfolded into a rugged planar configuration.

Each array block 602a-602d includes a respective first corporate manifold 608a-608d (608 generally) and a respective second corporate manifold 606a-606d (606 generally), with the first corporate manifolds 608 located below the second corporate manifolds 606 in the embodiment of FIG. 6. Each of the corporate manifolds 606, 608 are electrically connected to a respective plurality of serial manifolds (shown as vertical bars in FIG. 6).

In various embodiments, each corporate manifolds 606, 608 may be coupled to transmit/receive circuitry (e.g., transmitter 102 and/or receiver 104 in FIG. 1) using a feed cable (e.g., feed cable 610). In many embodiments, the feed cables are provided as flexible coaxial cables to allow folding and unfolding of the array 600. In various embodiments, the feed cables may also include signal paths to provide power and control signals for the array blocks 602 (e.g., to provide power and control to phase shifters within each of the corporate manifolds 606, 608).

As seen in FIG. 6, the radiating surface of the array 600 can be divided into eight independently-controllable sections denoted A1, A2, B1, B2, C1, C2, D1, and D2. During operation, beams may be transmitted and received from any combination of these array sections by providing appropriate control and power signals to the respective corporate manifolds 606, 608. In various embodiments, a receiver (e.g., receiver 104 in FIG. 1) may be configured to add and subtract signals received from the various array sections in order to make radar detections. For example, to detect a change in elevation of a received beam, the signals returned from each of the eight array sections may be combined as follows:

$$\Delta_{EL}=[(A1+A2)+(B1+B2)]-[(C1+C2)+(D1+D2)]$$

As another example, to detect a change in azimuth, the signals returned from the array sections may be combined as follows:

$$\Delta_{AZ}=[(A1+A2)+(D1+D2)]-[(B1+B2)+(C1+C2)]$$

For wide-beam applications, some of the array sections may disregarded (or "turned off") thereby decreasing the effective aperture size. For example, for wide-beam applications, change in azimuth may be detected as follows:

$$\Delta_{AZ\_WIDEBEAM}=(A2+D2)-(B1+C1)$$

Figure 6A:
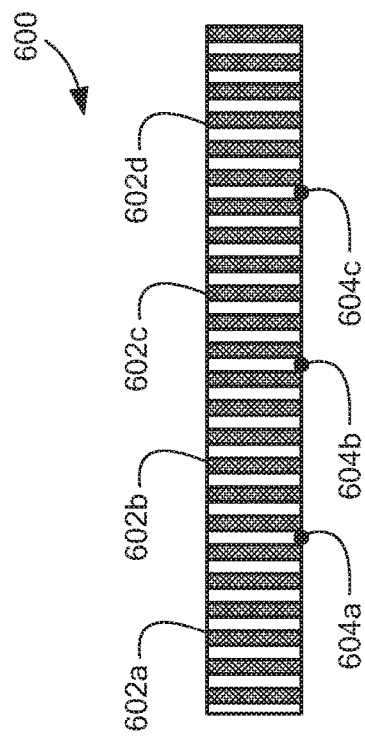
FIGS. 6A-6D are top views of the array of FIG. 6 arranged in different configurations.
Figure 6C:
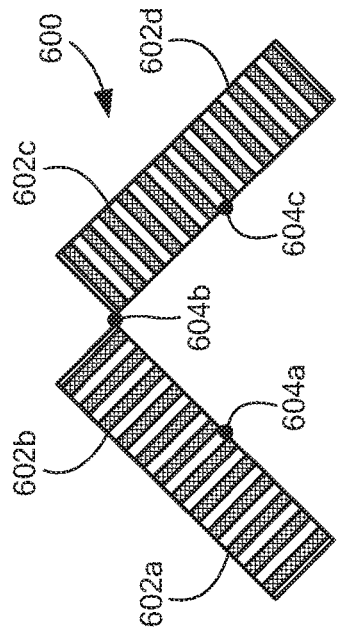
Figure 6B:
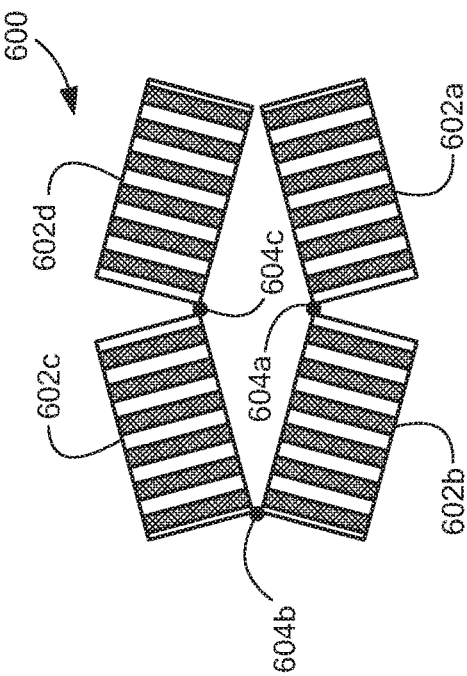

Referring to the top views of FIGS. 6A-6D in which like elements of FIG. 6 are shown using like reference designators, an array 600 having hinged connectors 604 may be arranged into several different configurations, according to some embodiments. FIG. 6A shows a planar configuration (e.g., the configuration also shown in FIG. 6) and FIG. 6B shows how the array 600 may be folded for storage or transport.

Figure 6D:
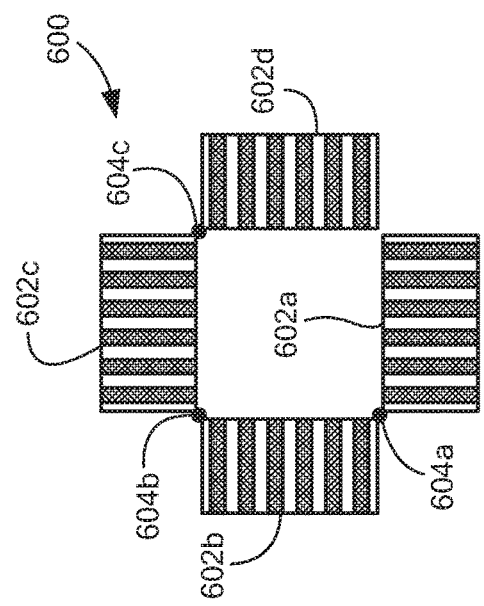

FIGS. 6C and 6D illustrate how the array 600 can be configured to cover an extended field-of-view (FOV) during deployment. In the example of FIG. 6C, array blocks 602a and 602b may be aligned to form a first ESA and array blocks 602c and 602d aligned to form a second ESA at a 90-degree angle from the first ESA. In this arrangement, two ESAs may provide a 180-degree FOV. In the example of FIG. 6D, each of the four array blocks 604a-604d may be used as a separate ESA to provide a 360-degree FOV as shown. It should be appreciated that each of the ESAs can be controlled independently (i.e., distinct beams may be transmitted and received from each ESA) due to architecture of the array 600 as previously described.

Figure 7B:
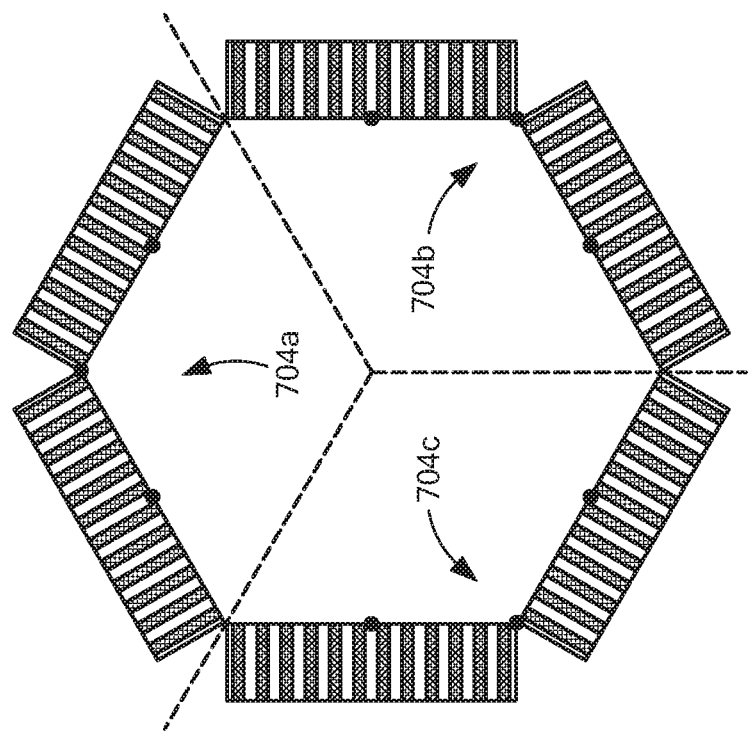
FIGS. 7A and 7B are top views showing multiple arrays deployed together, according to some embodiments.
Figure 7A:
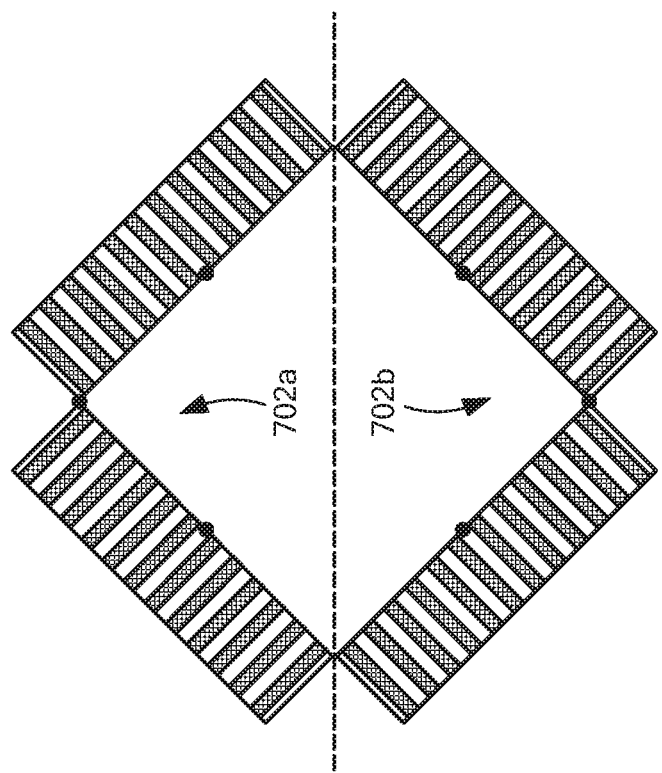

FIGS. 7A and 7B illustrate how multiple arrays can be deployed together to provide increased FOV. In the example of FIG. 7A, two arrays 702a, 702b (each of which may be the same as array 600 of FIG. 6) may be arranged as shown to provide four ESAs with a combined 360-degree FOV. In the example of FIG. 7B, three arrays 704a-704c (each of which may be the same as array 600 of FIG. 6) may be arranged as shown to provide six ESAs with a combined 360-degree FOV. It is appreciated that the arrangement of FIG. 7B may provide enhanced hand-off capability between ESAs.

In some embodiments, a single transmitter/receiver can feed into a switch matrix that then switches between arrays.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. An antenna assembly comprising:
one or more array blocks, at least one of the array blocks including:
one or more corporate manifolds, each of the corporate manifolds having an input port, a plurality of output ports, and a plurality of phase shifters, each of the phase shifters located at a respective one of the output ports of the corporate manifold, each of the plurality of phase shifters being arranged to receive a control signal that determines phase shift in azimuth, each of the corporate manifolds being configured to phase shift an applied RF signal in the azimuth by using the corporate manifold's respective plurality of phase shifters; and
a plurality of serial manifolds, each having an input port and a plurality of output ports, the input port of each of the serial manifolds coupled to a respective output port of one of the corporate manifolds, each of the serial manifolds being configured to passively phase shift the applied RF signal in elevation based on a frequency of the applied RF signal; and
a plurality of antenna elements coupled to each respective output port of one of the serial manifolds.

2. The antenna assembly of claim 1 wherein the serial manifolds are passive electronic elements.

3. The antenna assembly of claim 1 wherein the one or more array blocks includes at least two array blocks mechanically connected together.

4. The antenna assembly of claim 1 wherein the at least two array blocks are connected by hinged connectors.

5. The antenna assembly of claim 1 further comprising one or more support structures, wherein each of the serial manifolds is coupled to one of the support structures.

6. The antenna assembly of claim 5 wherein the support structures comprise a rigid foam material.

7. The antenna assembly of claim 5 wherein at least two serial manifolds are coupled to each of the support structures.

8. The antenna assembly of claim 5 wherein the support structures are arranged in a stack.

9. The antenna assembly of claim 8 wherein the serial manifolds are positioned on the respective support structures that all the antenna elements coupled thereto are adjacent to a first side of the stack.

10. The antenna assembly of claim 9 wherein the corporate manifolds are coupled to a second side of the stack opposite of the first side.

11. The antenna assembly of claim 5 wherein the one or more support structures includes at least six support structures each having at least two serial manifolds coupled thereto.

12. An electronically scanned array (ESA) radar system comprising:
a transmitter;
a receiver; and
an antenna assembly comprising:
one or more array blocks, at least one of the array blocks including:
one or more corporate manifolds, each of the corporate manifolds having an input port, a plurality of output ports, and a plurality of active phase shifters, each of the phase shifters located at a respective one of the output ports of the corporate manifold, each of the plurality of phase shifters being arranged to receive a control signal that determines phase shift in azimuth, each of the corporate manifolds being configured to phase shift an applied RF signal in the azimuth by using the corporate manifold's respective plurality of phase shifters; and
a plurality of serial manifolds, each having an input port and a plurality of output ports, the input port of each serial manifold coupled to a respective output port of one of the corporate manifolds, each of the serial manifolds being configured to passively phase shift the applied RF signal in elevation based on a frequency of the applied RF signal; and
a plurality of antenna elements coupled to each respective output port of one of the serial manifolds.

13. The system of claim 12 wherein the serial manifolds are passive electronic elements.

14. A method for providing an antenna assembly comprising:
providing one or more array blocks, at least one of the array blocks including:
providing one or more corporate manifolds, each of the corporate manifolds having an input port, a plurality of output ports, and a plurality of phase shifters, each of the phase shifters located at a respective one of the output ports of the corporate manifold, each of the plurality of phase shifters being arranged to receive a control signal that determines phase shift in azimuth, each of the corporate manifolds being configured to phase shift an applied RF signal in the azimuth by using the corporate manifold's respective plurality of phase shifters;
providing a plurality of serial manifolds, each having an input port and a plurality of output ports, the input port of each of the serial manifolds coupled to a respective output port of one of the corporate manifolds, each of the serial manifolds being configured to passively phase shift the applied RF signal in elevation based on a frequency of the applied RF signal; and
providing a plurality of antenna elements coupled to each respective output port of one of the serial manifolds.

15. The method of claim 14 wherein the serial manifolds are passive electronic elements.

* * * * *